US012489185B2

(12) United States Patent
Kim et al.

(10) Patent No.: US 12,489,185 B2
(45) Date of Patent: Dec. 2, 2025

(54) CAVITY FILTER FOR ANTENNA

(71) Applicant: KMW INC., Hwaseong-si (KR)

(72) Inventors: Joung Hoe Kim, Hwaseong-si (KR); Won Tai Kim, Yongin-si (KR)

(73) Assignee: KMW INC., Hwaseong-si (KR)

( * ) Notice: Subject to any disclaimer, the term of this patent is extended or adjusted under 35 U.S.C. 154(b) by 210 days.

(21) Appl. No.: 18/114,255

(22) Filed: Feb. 26, 2023

(65) Prior Publication Data

US 2023/0223702 A1 Jul. 13, 2023

Related U.S. Application Data

(63) Continuation of application No. PCT/KR2021/011336, filed on Aug. 25, 2021.

(30) Foreign Application Priority Data

Aug. 28, 2020 (KR) ........................ 10-2020-0109262
Aug. 23, 2021 (KR) ........................ 10-2021-0111160

(51) Int. Cl.
*H01P 1/208* (2006.01)
*H01P 1/207* (2006.01)

(52) U.S. Cl.
CPC .............. *H01P 1/208* (2013.01); *H01P 1/207* (2013.01)

(58) Field of Classification Search
CPC . H01P 1/208; H01P 1/207; H01P 7/04; H01Q 11/14
See application file for complete search history.

(56) References Cited

U.S. PATENT DOCUMENTS 4,730,174 A 3/1988 Nishikawa et al.
2018/0212298 A1 7/2018 Obermayer et al.
(Continued)

FOREIGN PATENT DOCUMENTS

CN 203747003 A 7/2014
CN 106129559 A 11/2016
EP 3547440 A1 10/2019
(Continued)

OTHER PUBLICATIONS

Non-final Office Action mailed Mar. 29, 2023 from the Korean Intellectual Property Office for Korean Application No. 10-2021-0111160.
(Continued)

*Primary Examiner* — Andrea Lindgren Baltzell
*Assistant Examiner* — Kimberly E Glenn
(74) *Attorney, Agent, or Firm* — Insight Law Group, PLLC; Seung Lee

(57) ABSTRACT

The present invention relates to a cavity filter for an antenna, specifically to a cavity filter comprising: a filter body having a plurality of cavities which are open at one side and are divided by a partition wall; a resonance bar installed at each of the plurality of cavities; a resonance bar boss into which a part of the resonance bar is inserted and which is provided such that the resonance bar is installed at the cavity; and a tolerance management stopper part which is disposed between an inner peripheral surface of the resonance bar boss and an outer peripheral surface of the resonance bar to perform stop-and-moving functions in an insertion direction of the resonance bar in designing the tolerance of the cavity, thereby providing the advantage of improving a production yield of an entire product.

16 Claims, 18 Drawing Sheets

(56) References Cited

U.S. PATENT DOCUMENTS

| | | | |
|---|---|---|---|
| 2018/0269553 | A1 | 9/2018 | Koo et al. |
| 2018/0358974 | A1 | 12/2018 | Santoniccolo et al. |

FOREIGN PATENT DOCUMENTS

| | | | |
|---|---|---|---|
| KR | 10-0807325 | B1 | 2/2008 |
| KR | 10-2010-0001571 | A | 1/2010 |
| KR | 20-2014-0004340 | U | 7/2014 |
| KR | 10-1528902 | B1 | 6/2015 |
| KR | 10-2020-0074649 | A | 6/2020 |

OTHER PUBLICATIONS

International Search Report mailed Dec. 1, 2021 for International Application No. PCT/KR2021/011336 and its English translation.
Office Action mailed on Mar. 19, 2024 from the Japanese Patent Office for Japanese Application No. 2023-513102.
Extended European Search Report mailed on Oct. 18, 2024 from the European Patent Office for European Application No. 21862051.6.

CAVITY FILTER FOR ANTENNA

CROSS-REFERENCE TO RELATED APPLICATIONS

This application is a continuation application of International Application No. PCT/KR2021/011336, filed Aug. 25, 2021, which claims the benefit of Korean Patent Application Nos. 10-2020-0109262, filed Aug. 28, 2020; and 10-2021-0111160, filed Aug. 23, 2021, in the Korean Intellectual Property Office, the disclosures of which are incorporated herein in their entirety by reference.

TECHNICAL FIELD

The present disclosure relates to a cavity filter for an antenna, and more particularly, to a cavity filter for an antenna, which can extend a design tolerance range relating to a part within a cavity.

BACKGROUND ART

Contents described in this part merely provide background information for the present embodiment, and do not constitute a conventional technology.

A multiple input multiple output (MIMO) technology is a technology for significantly increasing a data transmission capacity by using multiple antennas, and is a spatial multiplexing scheme in which a transmitter transmits different data through transmission antennas and a receiver distinguishes between the transmission data through proper signal processing. Accordingly, as the number of transmission antennas and the number of reception antennas are simultaneously increased, more data can be transmitted because a channel capacity is increased. For example, if the number of antennas is increased to 10, about a 10-times channel capacity is secured compared to a current single antenna system by using the same frequency band.

In 4G LTE-advanced, up to 8 antennas are used. In a current pre-5G stage, a product on which 64 or 128 antennas are mounted is being developed. In 5G, it is expected that base station equipment having much more antennas will be used. This is called a massive MIMO technology. A current cell operation is two-dimensional. In contrast, if the massive MIMO technology is introduced, the massive MIMO technology is called full dimension (FD)-MIMO because 3D-beamforming is made possible.

In the massive MIMO technology, as the number of antenna elements is increased, the number of corresponding transmitters/receivers and the number of corresponding filters are also increased. Furthermore, base stations have been nationally installed at 200,000 or more places in 2014. That is, a structure for a cavity filter, which minimizes a mounting space and can also be easily mounted, is required. An RF signal line connection structure that provides the same filter characteristics even after an individually tuned cavity filter is mounted on an antenna is required.

An RF filter having a cavity structure has a characteristic in that a resonator consisting of a resonant post (or a resonant bar), etc., that is, a conductor, is provided within a box structure formed of a metallic conductor and the RF filter transmits only a characteristic frequency of an ultra high frequency by resonance because only an electromagnetic field having a unique frequency is present in the cavity. A bandpass filter having such a cavity structure has a low insertion loss and is advantageous for high output, and is variously used as a filter for a mobile communication base station antenna.

However, the RF filter having a cavity structure has a problem in that a resonator provided within a cavity needs to be precisely manufactured within a design tolerance range (i.e., a variable range of a tuning design) upon manufacturing of the resonator, in performing a frequency tuning design within the cavity.

For example, if the resonator (a resonant bar) has been manufactured out of the design tolerance range, there is a problem in that the resonator needs to be post-processed so that the resonator falls within a frequency tuning design range upon actual frequency tuning of the cavity.

DISCLOSURE

Technical Problem

The present disclosure has been made to solve the problems, and an object of the present disclosure is to provide a cavity filter for an antenna, which can extend a tolerance range upon manufacturing of a resonator and facilitates a frequency tuning design within a cavity.

Objects of the present disclosure are not limited to the aforementioned object, and other objects not described above may be evidently understood by those skilled in the art from the following description.

Technical Solution

An embodiment of the cavity filter for an antenna according to the present disclosure includes a filter body having one side opened and having multiple cavities partitioned by barrier ribs, a resonant bar installed in each of the multiple cavities, a resonant bar boss having a part of the resonant bar inserted therein and provided so that the resonant bar is installed in the cavity, and a tolerance management stopper part disposed between an inner circumferential surface of the resonant bar boss and an outer circumferential surface of the resonant bar and configured to perform a moving and stop function in an insertion direction of the resonant bar upon resonant design of the cavity.

In this case, the resonant bar boss may protrude in the one direction from the bottom of the cavity, and may be formed in a circular pipe shape having an empty inside.

Furthermore, the cavity filter may further include a solder part hardened after being applied to a front end of the resonant bar boss, when the resonant bar is temporarily fixed at a design location according to the resonant design by the tolerance management stopper part.

Furthermore, the solder part may be applied and hardened so that the tolerance management stopper part is hidden from the outside.

Furthermore, the tolerance management stopper part may be integrally formed on the outer circumferential surface of the resonant bar that is inserted into the inner circumferential surface of the resonant bar boss.

Furthermore, the tolerance management stopper part may have a wrinkled shape. At least the diameter of an outer circumferential surface of the tolerance management stopper part that comes into contact with the inner circumferential surface of the resonant bar boss may be formed to have a size in which the outer circumferential surface of the tolerance management stopper part is forcedly fitted into the inner circumferential surface of the resonant bar boss.

Furthermore, the tolerance management stopper part may be a friction member disposed between the inner circumferential surface of the resonant bar boss and the outer circumferential surface of the resonant bar.

Furthermore, the friction member may include a wrinkle part that is interposed in the outer circumferential surface of the resonant bar and that has the outside pressurizing the inner circumferential surface of the resonant bar boss and the inside pressurizing the outer circumferential surface of the resonant bar.

Furthermore, the friction member may further include multiple incision parts formed by incising one side of the wrinkle part so that the multiple incision parts are spaced apart from each other in a circumferential direction thereof.

Furthermore, the friction member may further include a support plate part integrally formed on the other side of the wrinkle part and provided to surround a front end of the resonant bar along with the wrinkle part.

Furthermore, the resonant bar boss may be formed in a cylindrical shape that protrudes in the one direction from the bottom of the cavity.

Furthermore, the tolerance management stopper part may have a wrinkled shape. At least the diameter of an inner circumferential surface of the tolerance management stopper part that comes into contact with the outer circumferential surface of the resonant bar boss may be formed to have a size in which the outer circumferential surface of the tolerance management stopper part is forcedly fitted into the outer circumferential surface of the resonant bar boss.

Furthermore, the tolerance management stopper part may be a friction member disposed between the outer circumferential surface of the resonant bar boss and the inner circumferential surface of the resonant bar.

Furthermore, the friction member may include a wrinkle part that is interposed in the inner circumferential surface of the resonant bar and that has the outside pressurizing the inner circumferential surface of the resonant bar and the inside pressurizing the outer circumferential surface of the resonant bar boss.

Furthermore, the friction member may further include a support plate part integrally formed on the other side of the wrinkle part and provided to surround one end of the resonant bar boss along with the wrinkle part, and multiple incision parts configured to divide a part of the end of an edge of the support plate part and the wrinkle part in a way to be separated from each other in a circumferential direction thereof.

Furthermore, the resonant bar boss may be formed in a cylindrical shape having the diameter gradually reduced in the one direction from the bottom of the cavity. The tolerance management stopper part may be formed in a rib shape that protrudes in a central direction thereof from the inner circumferential surface of the resonant bar, wherein multiple protrusion ribs provided to be spaced apart from each other in a cylindrical direction may be integrally formed on the inner circumferential surface of the resonant bar.

Furthermore, the cavity filter may further include a filter cover configured to cover the opened one side of the cavity. The resonant design for the cavity space may be performed while repeatedly moving and stopping the resonant bar in a state in which the tolerance management stopper part has been installed, by using an external press-fitting member that has been inserted therethrough through a design hole for a cover for design that performs a cover function identical with a cover function of the filter cover and in which a predetermined design hole has been formed.

Advantageous Effects

In accordance with an embodiment of the cavity filter for an antenna according to the present disclosure, the following various effects may be achieved.

First, there is an effect in that a post-processing process for satisfying a tuning dimension within the cavity after a mold injection design for the resonant bar can be deleted.

Second, there is an effect in that a design tolerance of the resonant bar can be increased compared to the existing design tolerance.

Third, there is an effect in that the resonant bar can be manufactured to have a thin thickness because the resonant bar has only to be manufactured to have weight which can be supported by the solder part.

Fourth, there is an effect in that a high production yield can be achieved by reducing a processing cost and a production cost through the deletion of post-processing of the resonant bar and the reduction of the thickness of the resonant bar.

Figure 1:
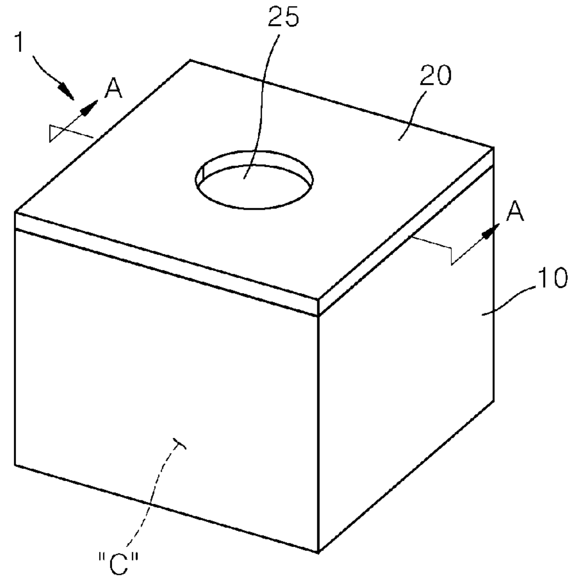
FIG. 1 is a mimetic diagram of an outward appearance illustrating a part of a cavity filter for an antenna according to the present disclosure.

| | |
|---|---|
| 1: cavity filter for antenna | 10: filter body |
| 20: filter cover | 25: engraving part |
| 30, 30-T, 30-P: resonant bar boss | 31-I: inner circumferential surface of resonant bar boss |
| 31-O: outer circumferential surface of resonant bar boss | 40: resonant bar |
| 41: stopper part installation stage | 50: tolerance management stopper part |
| 51a: external diameter | 52a: internal diameter |
| 60: solder part | 70: cover for design |
| 80: external press-fitting member | C: cavity |

BEST MODE

Hereinafter, a cavity filter for an antenna according to an embodiment of the present disclosure is described in detail with reference to the accompanying drawings.

In adding reference numerals to the components of each drawing, it should be noted that the same components have the same reference numerals as much as possible even if they are displayed in different drawings. Furthermore, in describing embodiments of the present disclosure, when it is determined that the detailed description of the related well-known configuration or function may obscure the gist of the present disclosure, the detailed description thereof will be omitted.

In describing components of an embodiment of the present disclosure, terms, such as a first, a second, A, B, (a), and (b), may be used. Such terms are used only to distinguish one component from another component, and the essence, order, or sequence of a corresponding component is not limited by the terms. All terms used herein, including technical or scientific terms, have the same meanings as those commonly understood by a person having ordinary knowledge in the art to which the present disclosure pertains, unless defined otherwise in the specification. Terms, such as those commonly used and defined in dictionaries, should be construed as having the same meanings as those in the context of a related technology, and are not construed as having an ideal meaning or an excessively formal meaning unless explicitly defined otherwise in the specification.

Figure 2:
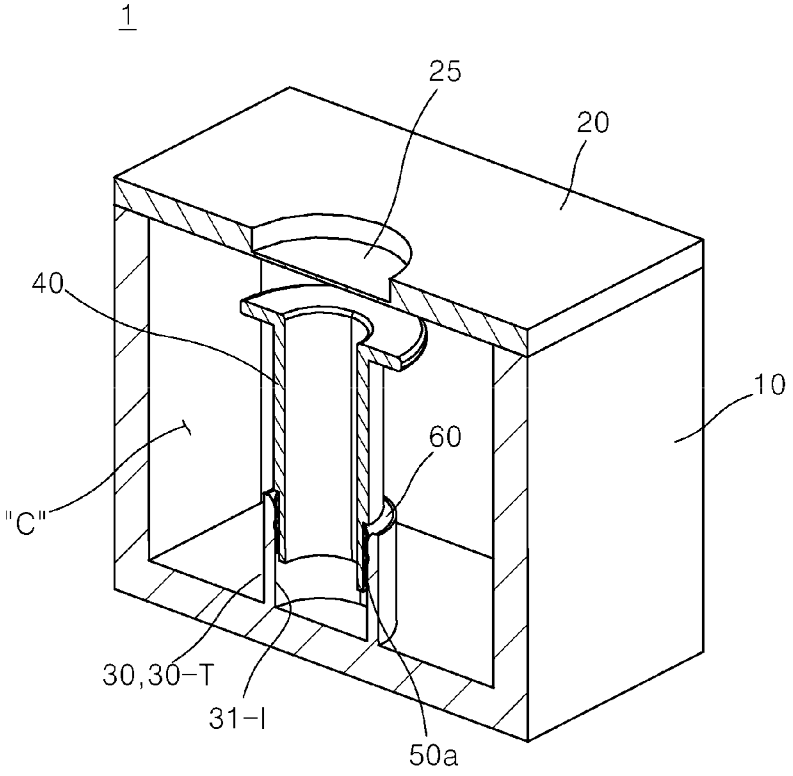
FIG. 2 is a cutaway perspective view taken along line A-A in FIG. 1, and is a cutaway perspective view illustrating a first embodiment of a tolerance management stopper part, among components of the cavity filter for an antenna, according to an embodiment of the present disclosure.
Figure 3:
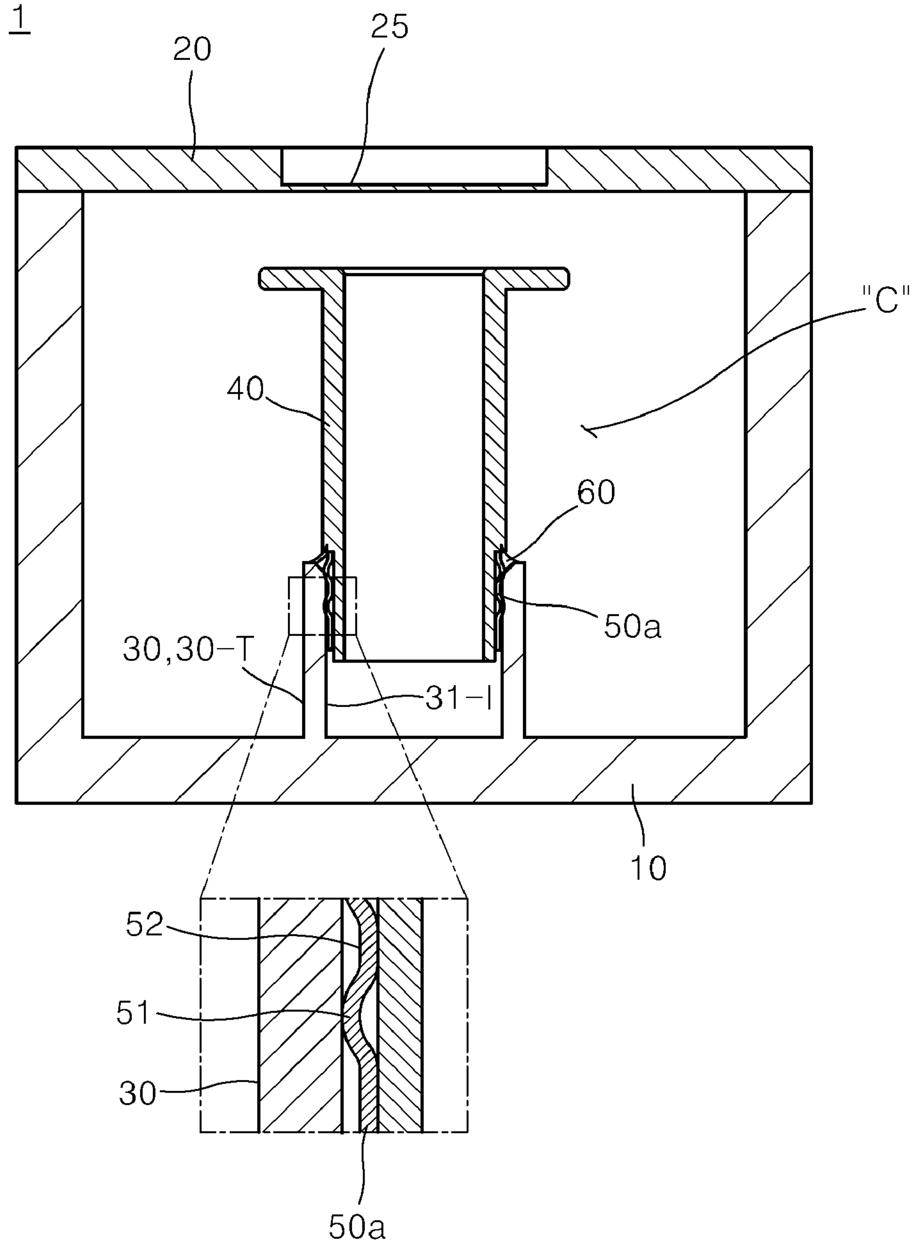
FIG. 3 is a cross-sectional view taken along line A-A in FIG. 1.
Figure 4:
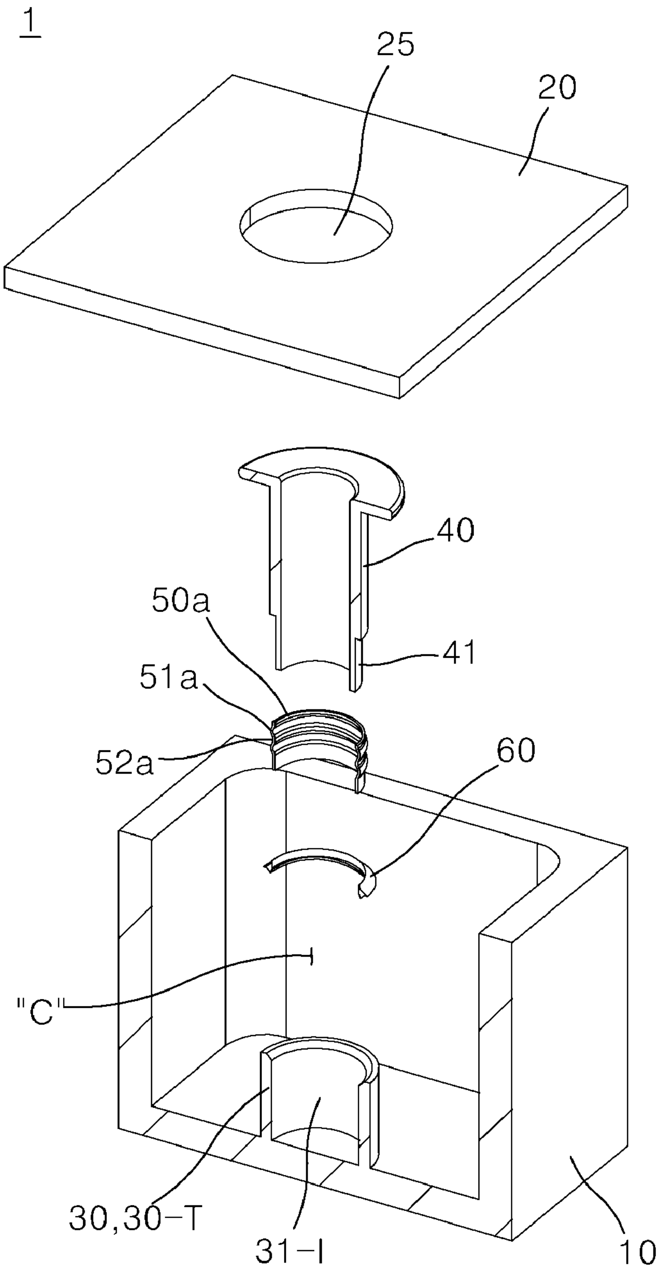
FIG. 4 is a cutaway exploded perspective view taken along line A-A in FIG. 1.

FIG. 1 is a mimetic diagram of an outward appearance illustrating a part of a cavity filter for an antenna according to the present disclosure. FIG. 2 is a cutaway perspective view taken along line A-A in FIG. 1. FIG. 3 is a cross-sectional view taken along line A-A in FIG. 1. FIG. 4 is a cutaway exploded perspective view taken along line A-A in FIG. 1.

An embodiment 1 of the cavity filter for an antenna according to the present disclosure includes a filter body 10 having a cavity C having one side opened and a filter cover 20 disposed to cover the opened one side of the cavity C of the filter body 10, as referenced in FIGS. 1 to 4.

Multiple cavities C partitioned by barrier ribs not illustrated may be formed in the filter body 10. The multiple cavities C may be designed through a frequency tuning design so that only respective specific frequencies pass through the multiple cavities. In the drawings illustrated in relation to embodiments of the present disclosure, only one cavity C has been diagrammed. The diagrammed unit cavity C may be continuously provided in a plural number, thus forming the filter body 10. Therefore, it has only to be understood that a component that partitions the cavities C, among components of the filter body 10, can function as the barrier rib.

The filter body 10 may be generally formed of a dielectric material. The filter body 10 may be provided so that only an electromagnetic field having a unique frequency within the cavity C is present by forming a film of a metallic material on all of an inner surface that forms the cavity C and a portion that forms an outward appearance of the cavity C.

In the embodiment 1 of the cavity filter for an antenna according to the present disclosure, the filter body 10 in which a single cavity C has been formed as referenced in FIGS. 1 to 4 is described as an example, for convenience of description. An outward appearance of each cavity C that is provided in the filter body 10 may be formed in a different form depending on a design value of a specific frequency. As described later, however, description is given based on the premise that both a resonant bar 40 and a resonant bar boss 30 for installing the resonant bar 40 are essentially provided.

In this case, the embodiment 1 of the cavity filter for an antenna according to the present disclosure may further include the resonant bar 40 installed in each of the multiple cavities C, and the resonant bar boss 30 into which a part of the resonant bar 40 is inserted and that is provided so that the resonant bar 40 is installed in the cavity C, as referenced in FIGS. 1 to 4.

The resonant bar 40 is provided as a metallic material, and is one of major components of the filter in which a frequency tuning design is performed along a space (or a separation distance) between the resonant bar 40 and the filter cover 20 within the cavity C.

In the resonant bar 40 that performs such a function, as referenced in FIGS. 2 to 4, frequency tuning may be performed through the adjustment of a distance between the resonant bar 40 and an inner surface of the filter cover 20, which is changed depending on the height from a closed bottom of the cavity C formed in the filter body 10 to the opened one side of the cavity C.

More specifically, a part of the front end of the resonant bar 40 on the other side thereof may be inserted and fixed to the resonant bar boss 30 provided at the bottom of the cavity C of the filter body 10. A separation distance between the front end of the resonant bar 40 on one side thereof and the filter cover 20 may be changed based on the amount of the resonant bar 40 that is inserted into the resonant bar boss 30. The frequency tuning design may be decided based on the changed separation distance.

The resonant bar boss 30, 30-T (tube) has been provided so that the resonant bar 40 is installed within the cavity C as described above. As referenced in FIGS. 2 to 4, the resonant bar boss may be formed in an approximately circular pipe shape the inside of which is empty. In this case, the resonant bar boss 30, 30-T may be formed integrally with the filter body 10 within the cavity C when the filter body 10 is manufactured by using a mold.

However, the resonant bar boss 30 does not need to be essentially formed integrally with the filter body 10, and may be manufactured separately from the filter body 10 and coupled within the cavity C of the filter body 10 in a way to be detachable from the filter body 10. Furthermore, the resonant bar boss 30 does not need to be essentially formed in the circular pipe shape. As in other embodiments (a fourth embodiment and a fifth embodiment) of a tolerance management stopper part, which have been referenced in FIGS. 12 to 17 described later, among the components of the cavity filter for an antenna according to an embodiment of the present disclosure, the resonant bar boss 30 may be provided in a cylindrical shape that protrudes in the opened one direction from the bottom of the cavity C (refer to FIGS. 12 to 14), or may be formed in the cylindrical shape having a diameter gradually reduced in the opened one direction from the bottom of the cavity C (refer to FIGS. 15 to 17) (refer to reference numeral "30-P" in each figure). A lower end of the resonant bar 40 may be fitted and coupled to surround the outer circumferential surface of one end of the resonant bar boss 30-P having the cylindrical shape. This is more specifically described later.

Moreover, the embodiment 1 of the cavity filter for an antenna according to the present disclosure may further include a tolerance management stopper part 50*a* as referenced in FIGS. 2 to 4. Hereinafter, the tolerance management stopper part 50*a* referenced in FIGS. 2 to 4 is named a "tolerance management stopper part according to a first embodiment". The reference numeral is indicated as "50*a*" in order to distinguish between the reference numeral and those in a second embodiment and a third embodiment described later.

As referenced in FIGS. 2 to 4, the tolerance management stopper part 50*a* according to the first embodiment may be disposed between an inner circumferential surface 31-I (In) of the resonant bar boss 30-T and an outer circumferential surface of the resonant bar 40. The tolerance management stopper part 50*a* according to the first embodiment performs a role of performing a moving and stop function in the insertion direction of the resonant bar 40 upon resonant design of the cavity C.

More specifically, when a predetermined external force is applied to the resonant bar 40 so that a resonant frequency of the cavity C can be tuned, the resonant bar 40 may be fixed within the cavity C of the filter body 10 in a way to be movable with respect to the resonant bar boss 30-T. The tuning of the resonant frequency is performed by an operation of the resonant bar 40 moving within the cavity C through the medium of the resonant bar boss 30-T as described above.

In this case, the tolerance management stopper part 50*a* according to the first embodiment is moved when a resonant designer applies a predetermined external force or higher for the tuning of the resonant frequency, and plays a role of performing temporary fixing by being stopped with respect to the resonant bar boss 30-T when the external force is released.

The embodiment 1 of the cavity filter for an antenna according to the present disclosure can extend a design tolerance of the resonant bar 40 compared to a conventional technology because the tolerance management stopper part 50*a* according to the first embodiment is provided. That is, by further extending a preset design tolerance range, a precise manufacturing design is not required upon manufacturing of the resonant bar 40, and a process of post-processing the resonant bar 40 in tuning a resonant frequency within the cavity C can be obviated.

Meanwhile, the embodiment 1 of the cavity filter for an antenna according to the present disclosure may further include a solder part 60 that fully fixes the resonant bar 40 as the solder part 60 is applied at the front end of the resonant bar boss 30-T and then hardened, when the resonant bar 40 is temporarily fixed at a design location according to a resonant design by the tolerance management stopper part 50*a* according to the first embodiment, as referenced in FIGS. 2 to 4.

The tolerance management stopper part 50*a* according to the first embodiment may complete the function of temporarily fixing the resonant bar 40 at a predetermined location of the resonant bar boss 30-T according to a resonant frequency tuning design as described above. The resonant bar 40 may be fully fixed at the temporally fixed location of the resonant bar boss 30-T by the solder part 60.

The solder part 60 may be applied and hardened so that the tolerance management stopper part 50*a* according to the first embodiment is hidden from the outside. Any material may be adopted as the solder part 60 as long as the material enables the tolerance management stopper part 50*a* according to the first embodiment to be hidden from the outside and does not affect a resonant frequency tuning design within the cavity C. For example, a meltable lead material may be adopted as the solder part 60, and a common adhesive material may also be adopted as the solder part 60.

The solder part 60 may be applied and hardened at a step portion formed by the front end of the resonant bar boss 30-T and the outer circumferential surface of the resonant bar 40 in a ring shape, thus firmly fixing the resonant bar 40 to the resonant bar boss 30-T.

Meanwhile, the tolerance management stopper part 50*a* according to the first embodiment may be integrally formed on the outer circumferential surface of the resonant bar 40 that is inserted into the inner circumferential surface 31-I of the resonant bar boss 30-T (refer to the second embodiment and the third embodiment referenced in FIGS. 6 to 8 described later).

Furthermore, the tolerance management stopper part 50*a* according to the first embodiment may be forcedly fitted and coupled to the inside of the resonant bar boss 30-T, after being manufactured as a separate component and previously (first) coupled to the resonant bar boss 30 (refer to the third embodiment referenced in FIGS. 1 to 4 and FIGS. 9 to 11 described later). That is, the tolerance management stopper part 50*a* according to the first embodiment may be a friction member that is disposed between the inner circumferential surface 31-I of the resonant bar boss 30-T and the outer circumferential surface of the resonant bar 40.

The second embodiment and second embodiment of the tolerance management stopper part 50*a* are more specifically described later.

Figure 5A:
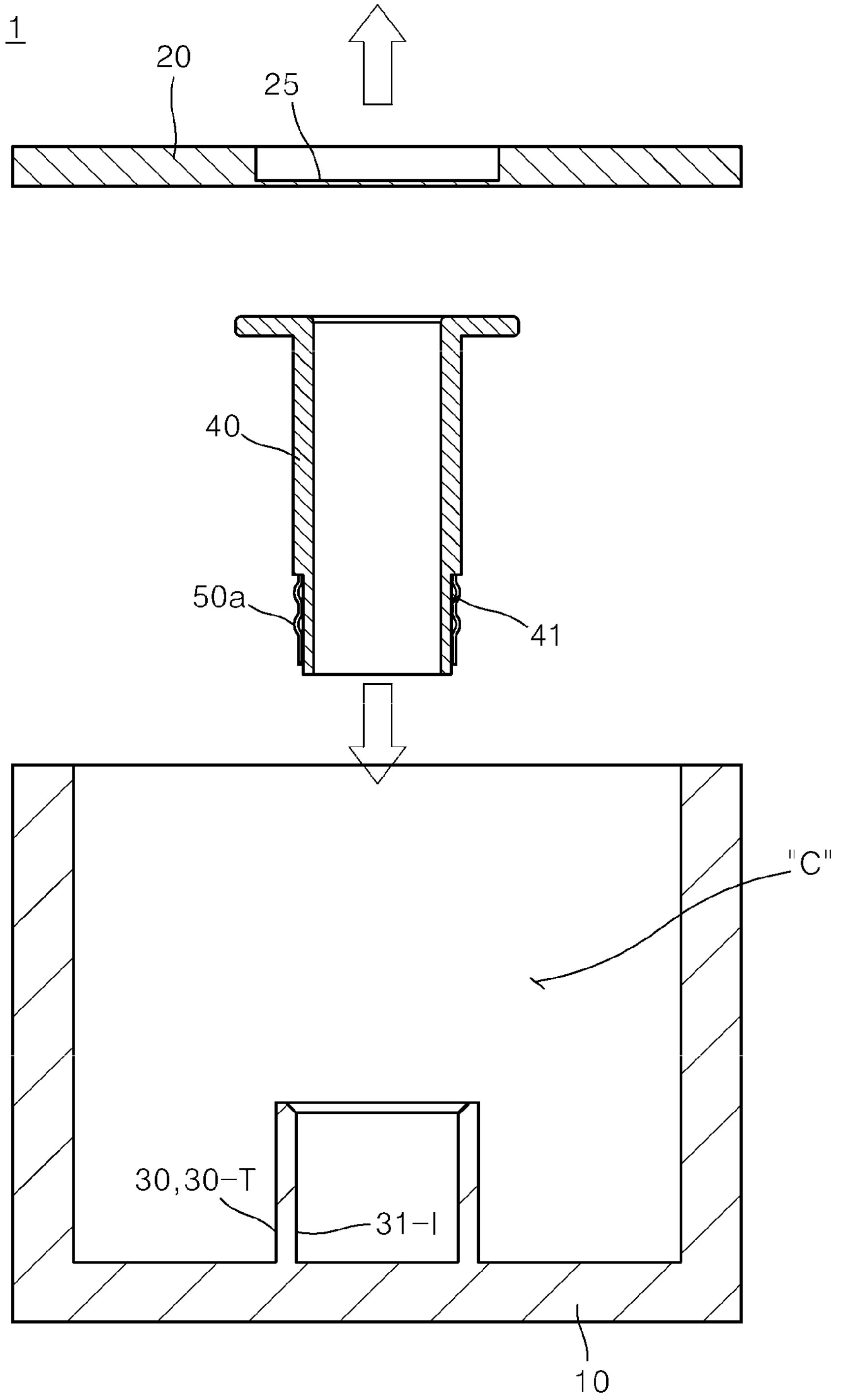
FIGS. 5A to 5C are cross-sectional exploded views illustrating the order in which a resonant bar is installed within a cavity.
Figure 5B:
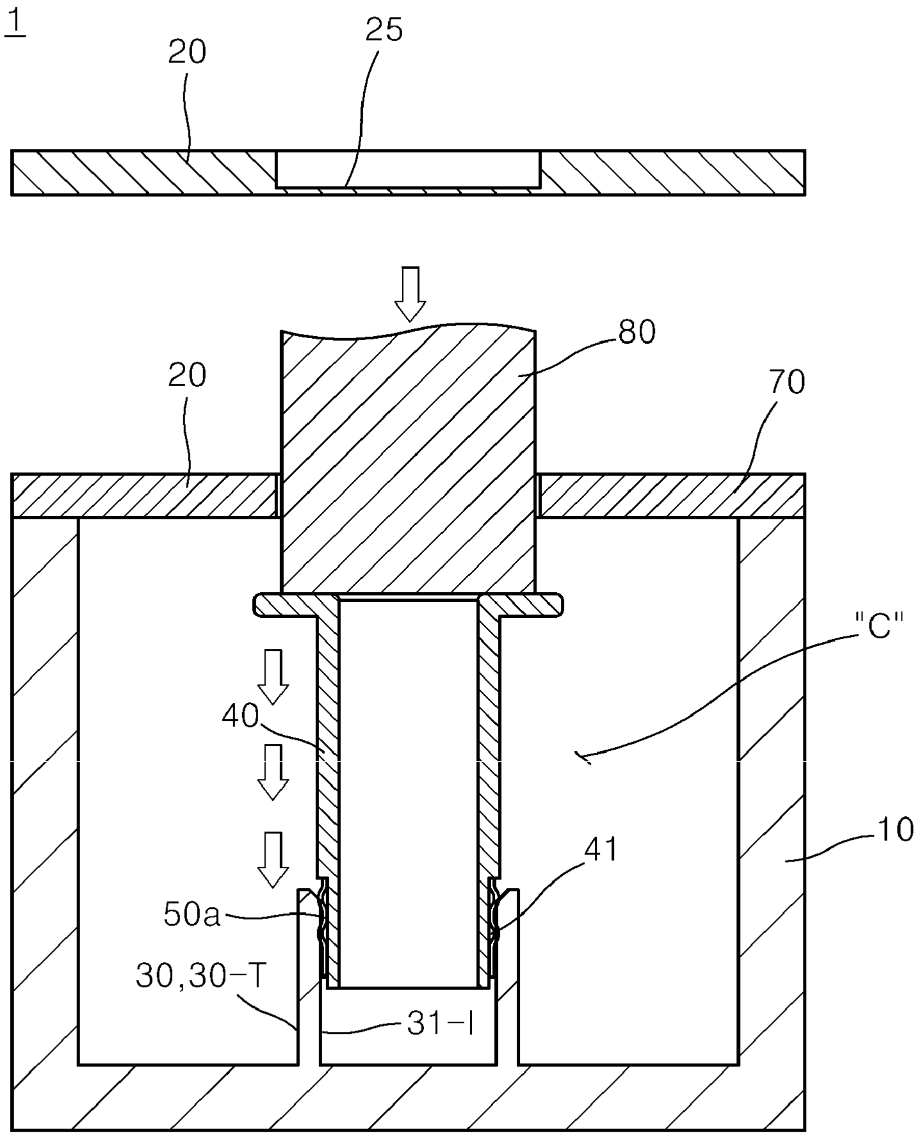
Figure 5C:
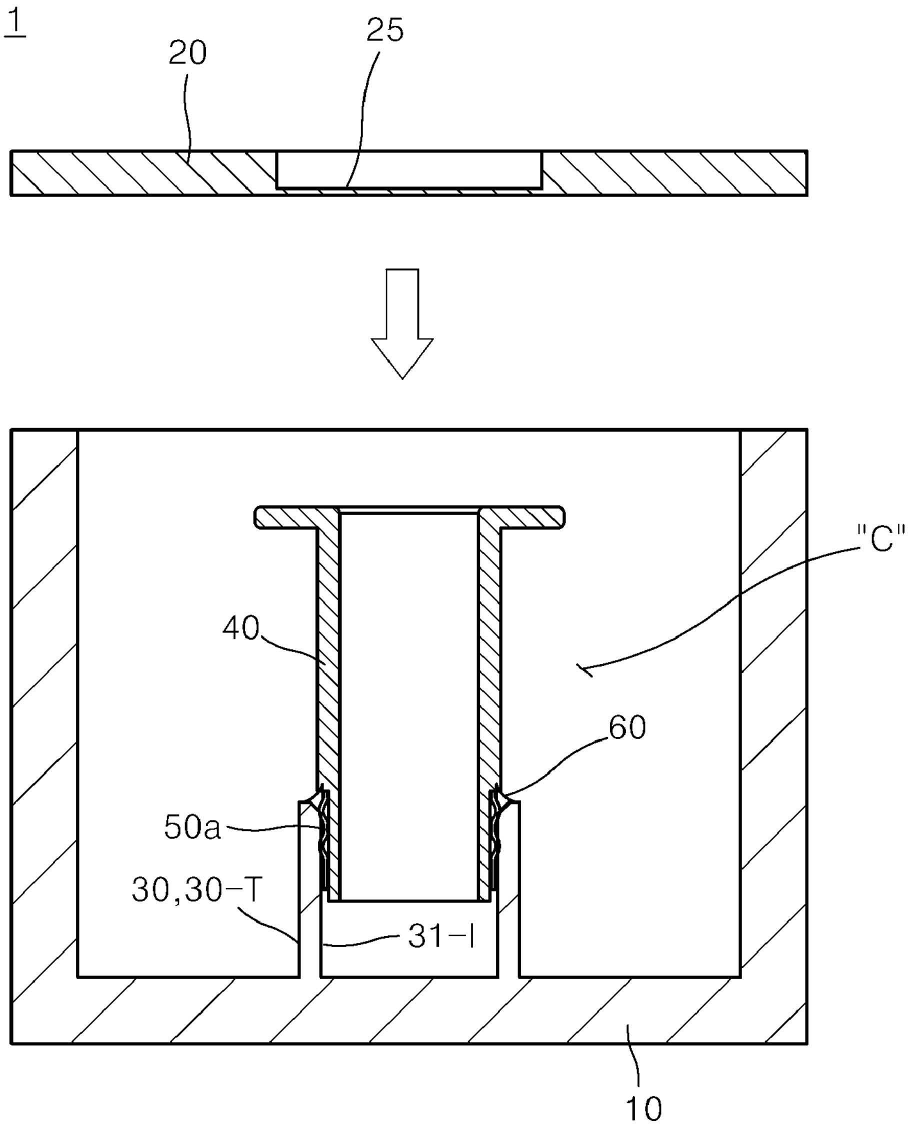

FIGS. 5A to 5C are cross-sectional exploded views illustrating the order in which the resonant bar 40 is installed within the cavity C.

A form in which the resonant bar 40 is installed within the cavity C is briefly described as follows with reference to FIGS. 5A to 5C.

First, FIG. 5A is the state in which the filter cover 20 has been removed from the filter body 10. In the state in which the tolerance management stopper part 50*a* according to the first embodiment has been provided in the front end of the resonant bar 40 on the other side thereof, the resonant bar 40 is disposed over the opened top of the resonant bar boss 30-T.

Furthermore, as referenced in FIG. 5B, a part of the front end of the resonant bar 40 on the other side thereof is forcedly fitted and coupled to the inside of the resonant bar boss 30-T. At this time, when an external force that is provided by an assembler (a resonant frequency tuning designer) is a predetermined external force or more by the tolerance management stopper part 50*a* according to the first embodiment, which is integrally provided at the front end of the resonant bar 40 on the other side thereof or provided as a separate component coupled thereto, the resonant bar 40 may be moved along the resonant bar boss 30-T and may be stopped and temporarily fixed at an arbitrary location when the external force of the assembler is removed.

Finally, as referenced in FIG. 5C, the solder part 60 is applied to a step portion that is formed by the front end of the resonant bar boss 30-T and the resonant bar 40 in a ring shape, and is applied and then hardened so that the tolerance management stopper part 50*a* according to the first embodiment is hidden from the outside, so that the resonant bar 40 can be firmly fixed at a tuning-designed location of a resonant frequency. In this case, the resonant bar 40 has an advantage in that the resonant bar 40 can be manufactured at a thinner thickness compared to a conventional technology because the resonant bar 40 can be manufactured with weight by which the resonant bar 40 has only to be fixed by the solder part 60 without being detached. If the thickness of the resonant bar 40 is thin, a production cost can be naturally reduced.

In particular, during the assembly process of the resonant bar 40 which has been referenced in FIGS. 5B and 5C, a tuning design for a resonant frequency within the cavity C may be primarily performed. In this case, a cover for design 70 that performs the same cover function as the filter cover 20 is installed instead of the filter cover 20. In this case, the primary tuning design for the resonant frequency is performed by repeatedly moving the resonant bar 40 by applying a predetermined external force or higher to the resonant bar 40 in the state of FIG. 5B in which the tolerance management stopper part 50*a* according to the first embodiment has been installed and stopping the resonant bar 40 by an operation of removing the external force, by using an external press-fitting member 80 inserted into the cover for design 70 therethrough through a predetermined design hole that has already been formed in the cover for design 70.

Furthermore, although not illustrated, when the primary tuning design for the resonant frequency is completed as described above, after the cover for design 70 is removed and the filter cover 20 is coupled, a secondary tuning design for the resonant frequency may be precisely performed by an operation of performing engraving on an engraving part 25 that has been formed in the filter cover 20 by using a predetermined engraving tool on the outside so that a change in the shape of the filter cover 20 according to the engraving within the cavity C is incorporated.

Figure 6:
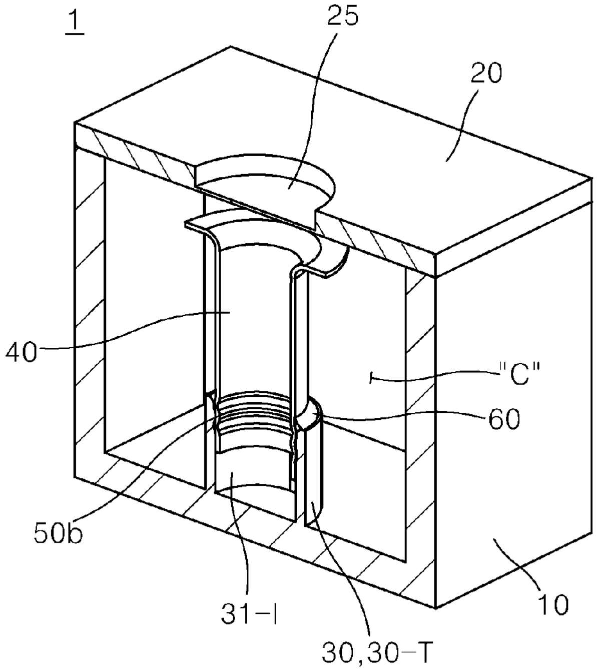
FIG. 6 is a cutaway perspective view taken along line A-A in FIG. 1, and is a cutaway perspective view illustrating a second embodiment of the tolerance management stopper part, among the components of the cavity filter for an antenna according to an embodiment of the present disclosure.

FIG. 6 is a cutaway perspective view taken along line A-A in FIG. 1, and is a cutaway perspective view illustrating the second embodiment of the tolerance management stopper part, among the components of the cavity filter for an antenna according to an embodiment of the present disclosure. FIG. 7 is a cross-sectional view of FIG. 6. FIG. 8 is an incised and exploded perspective view of FIG. 6.

In the embodiment 1 of the cavity filter for an antenna according to the present disclosure, the tolerance management stopper part 50*a* according to the first embodiment has been provided as a component that is manufactured separately from the resonant bar 40 and that is interposed between the inner circumferential surface 31-I of the resonant bar boss 30-T and the outer circumferential surface of the resonant bar 40 for the primary tuning design for the resonant frequency within the cavity C, as referenced in FIGS. 2 to 4. However, as referenced in FIGS. 2 to 4, the tolerance management stopper part 50*a* according to the first embodiment does not need to be essentially manufactured as a separate component.

Figure 7:
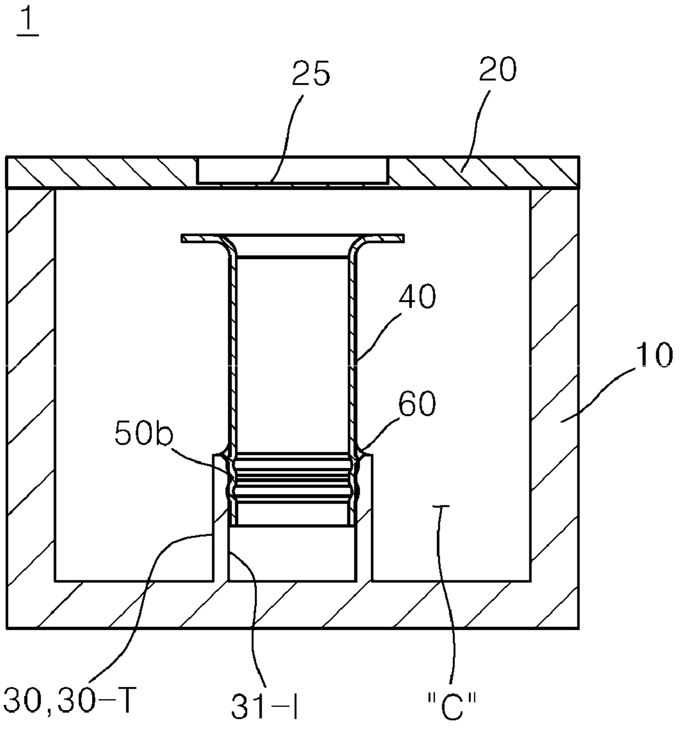
FIG. 7 is a cross-sectional view of FIG. 6.
Figure 8:
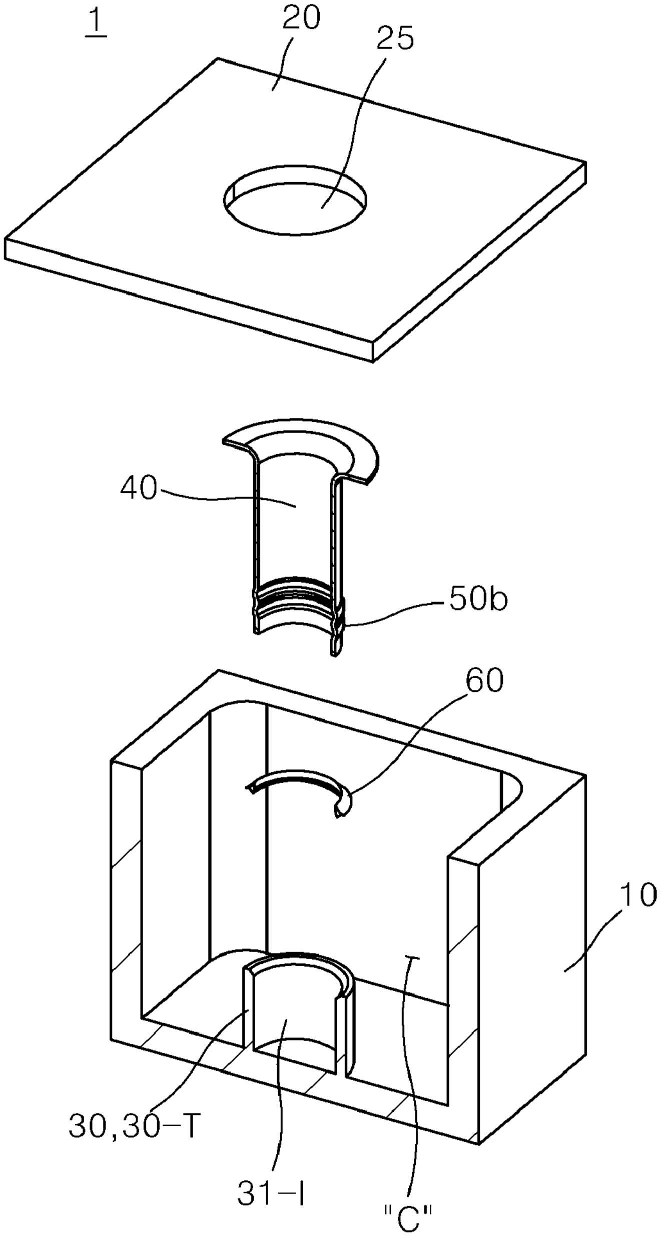
FIG. 8 is an incised and exploded perspective view of FIG. 6.

That is, as referenced in FIGS. 6 to 8, a tolerance management stopper part 50*b* according to the second embodiment may be integrally formed on the outer circumferential surface of the resonant bar 40 (in particular, the outer circumferential surface of the front end of the resonant bar 40 on the other side thereof) that is inserted into the inner circumferential surface 31-I of the resonant bar boss 30-T. Hereinafter, the tolerance management stopper part 50 referenced in FIGS. 2 to 4 is named "the tolerance management stopper part 50*a* according to the first embodiment", and the tolerance management stopper part 50*b* referenced in FIGS. 6 to 8 is named "the tolerance management stopper part 50*b* according to the second embodiment", for convenience of description.

Each of the tolerance management stopper part 50*a* according to the first embodiment and the tolerance management stopper part 50*b* according to the second embodiment has a wrinkled shape, as referenced in FIGS. 4 and 8, but at least the diameter of an outer circumferential surface of the tolerance management stopper part that comes into contact with the inner circumferential surface 31-I of the resonant bar boss 30-T may be formed to have a size in which the outer circumferential surface of the tolerance management stopper par is forcedly fitted into the inner circumferential surface 31-I of the resonant bar boss 30-T.

In this case, if the tolerance management stopper part 50*a* according to the first embodiment is provided as a friction member that is a separate component as referenced in FIG. 4, the tolerance management stopper part 50*a* may include a wrinkle part 50*a*-1 that is interposed in the outer circumferential surface of the resonant bar 40, but the outside of the wrinkle part pressurizes the inner circumferential surface 31-I of the resonant bar boss 30-T and the inside thereof pressurizes the outer circumferential surface of the resonant bar 40.

It is preferred that an internal diameter 52*a* of an inner circumferential surface that belongs to a wrinkled shape of the wrinkle part 50*a*-1 and that comes into contact with at least the outer circumferential surface of the resonant bar 40 is formed to have a size in which the inner circumferential surface of the wrinkle part is forcedly fitted into the outer circumferential surface of the resonant bar 40. Furthermore, it is preferred that an external diameter 51*a* of an outer circumferential surface that belongs to the wrinkled shape of the wrinkle part 50*a*-1 and that comes into contact with at least the inner circumferential surface 31-I of the resonant bar boss 30-T is formed to have a size in which the inner circumferential surface of the wrinkle part is forcedly fitted into the inner circumferential surface 31-I of the resonant bar boss 30-T.

Accordingly, first, when the tolerance management stopper part 50*a* according to the first embodiment is coupled to the resonant bar 40, after the tolerance management stopper part is forcedly fitted into the resonant bar 40 and firmly closely attached thereto due to the size of the internal diameter 52*a* of the tolerance management stopper part, the tolerance management stopper part is firmly closely attached to the inner circumferential surface 31-I of the resonant bar boss 30-T by being forcedly fitted into and coupled to the inner circumferential surface 31-I thereof due to the size of the external diameter 51*a*. Accordingly, the temporary fixing of the tolerance management stopper part 50*a* according to a predetermined frictional force is performed.

In contrast, the tolerance management stopper part 50*b* according to the second embodiment is integrally formed in the resonant bar 40 as referenced in FIGS. 6 to 8. Accordingly, a slip problem with the resonant bar 40 does not occur, and the tolerance management stopper part is forcedly fitted and coupled to the inner circumferential surface 31-I of the resonant bar boss 30-T by the size of the external diameter thereof. Accordingly, the tolerance management stopper part can be configured to be temporarily fixed according to a predetermined frictional force.

Figure 9:
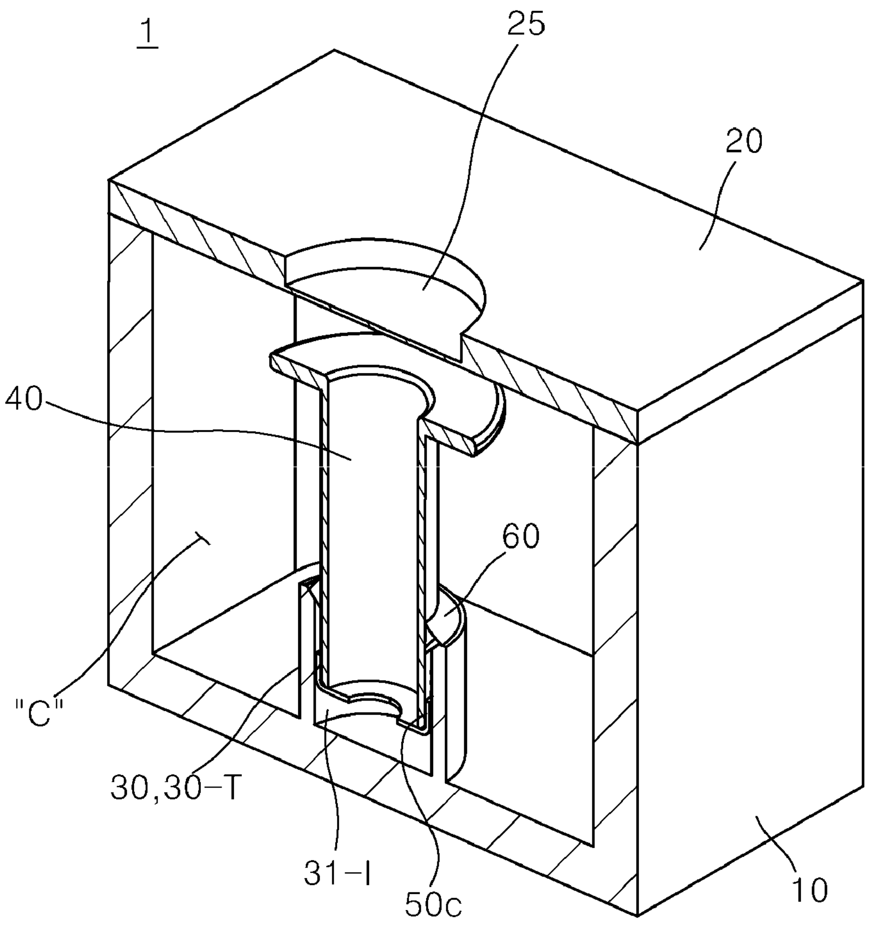
FIG. 9 is a cutaway perspective view taken along line A-A in FIG. 1, and is a cutaway perspective view illustrating a third embodiment of the tolerance management stopper part, among the components of the cavity filter for an antenna according to an embodiment of the present disclosure.
Figure 10:
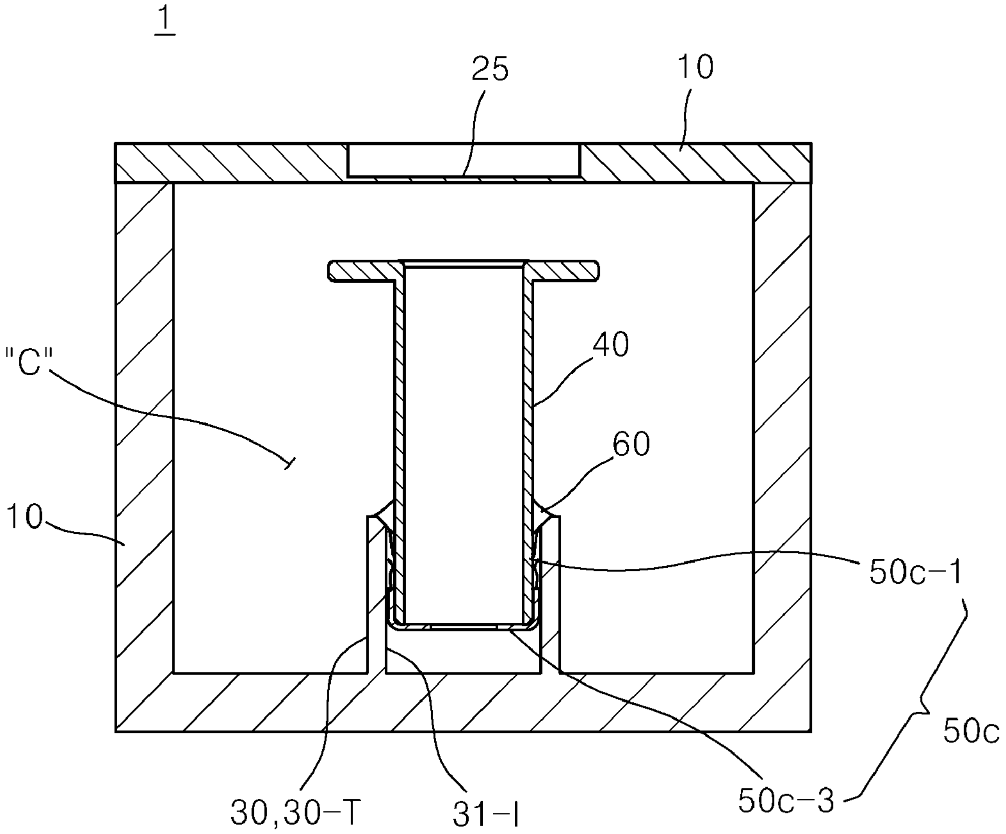
FIG. 10 is a cross-sectional view of FIG. 9.
Figure 11:
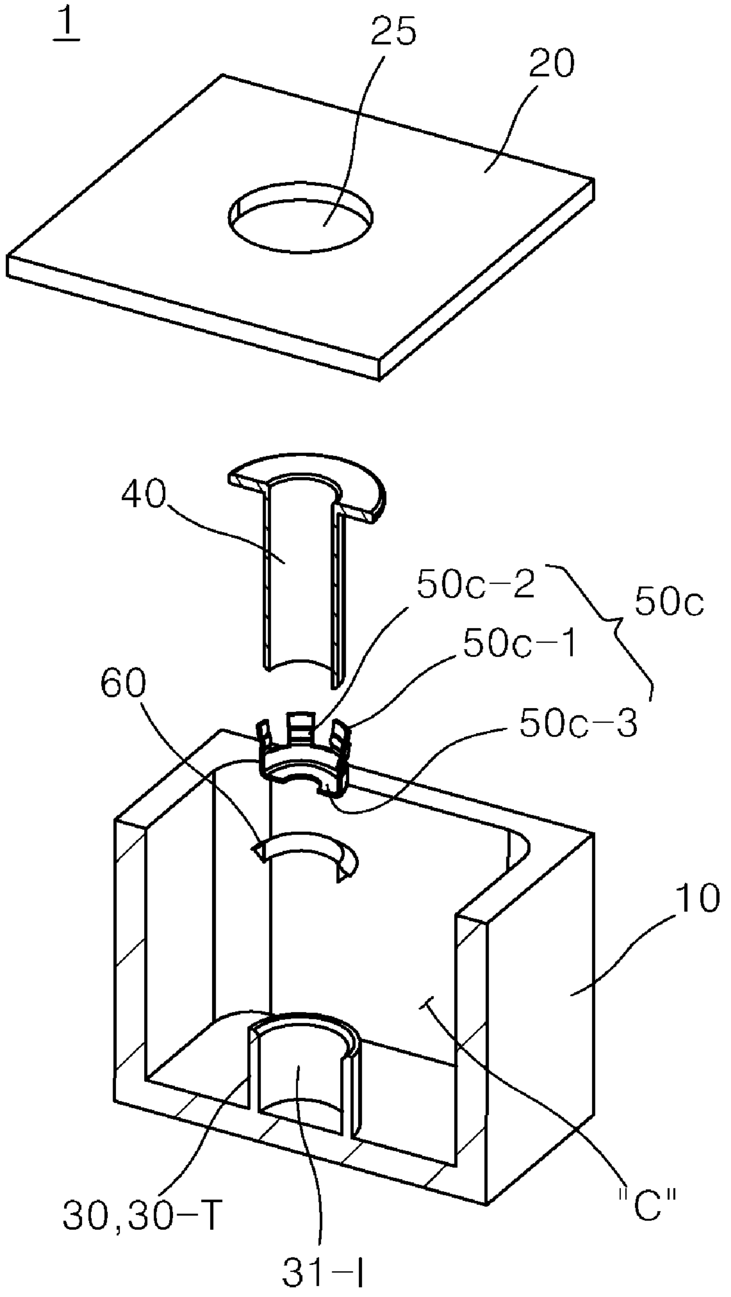
FIG. 11 is an incised and exploded perspective view of FIG. 9.

FIG. 9 is a cutaway perspective view taken along line A-A in FIG. 1, and is a cutaway perspective view illustrating the third embodiment of the tolerance management stopper part, among the components of the cavity filter for an antenna according to an embodiment of the present disclosure. FIG. 10 is a cross-sectional view of FIG. 9. FIG. 11 is an incised and exploded perspective view of FIG. 9.

Referring to FIGS. 9 to 11, there is disclosed a tolerance management stopper part 50*c* according to the third embodiment as a modified example of the tolerance management stopper part 50*a* according to the first embodiment.

That is, as referenced in FIGS. 9 to 11, the tolerance management stopper part 50*c* according to the third embodiment may include a wrinkle part 50*c*-1 that is interposed in the outer circumferential surface of the resonant bar 40, and that has the outside pressurizes the inner circumferential surface 31-I of the resonant bar boss 30-T and the inside pressurizing the outer circumferential surface of the resonant bar 40, multiple incision parts 50*c*-2 formed by incising one side of the wrinkle part 50*c*-1 so that the multiple incision parts 50*c*-2 are spaced apart from each other in a circumferential direction thereof, and a support plate part 50*c*-3 integrally formed on the other side of the wrinkle part 50*c*-1 and provided to surround the front end of the resonant bar 40 along with the wrinkle part 50*c*-1.

In this case, the one side of the wrinkle part 50*c*-1 means a direction in which the filter cover 20 is coupled, and the other side of the wrinkle part 50*c*-1 means a direction corresponding to the front end of the resonant bar 40.

The wrinkle part 50*c*-1 including the multiple incision parts 50*c*-2 is interposed between the outer circumferential surface of the resonant bar 40 and the inner circumferential surface 31-I of the resonant bar boss 30-T, and may perform a role to facilitate forced fitting and coupling while being elastically deformed by an external force that is provided by an assembler (or a resonant tuning designer).

Furthermore, the support plate part 50*c*-3 is provided to surround the front end of the resonant bar 40 on the other side thereof, and can prevent a portion corresponding to the wrinkle part 50*c*-1 from being twisted.

Figure 12:
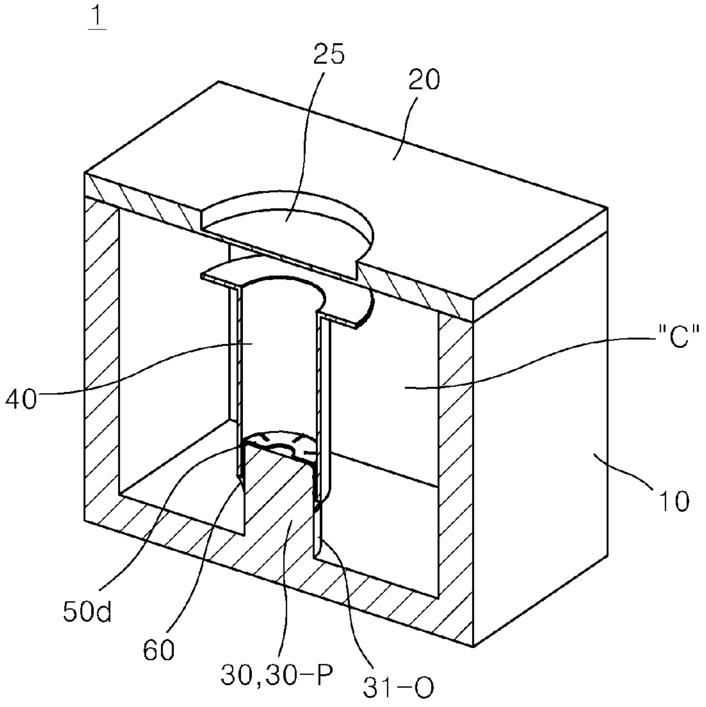
FIG. 12 is a cutaway perspective view taken along line A-A in FIG. 1, and is a cutaway perspective view illustrating a fourth embodiment of the tolerance management stopper part, among the components of the cavity filter for an antenna according to an embodiment of the present disclosure.
Figure 13:
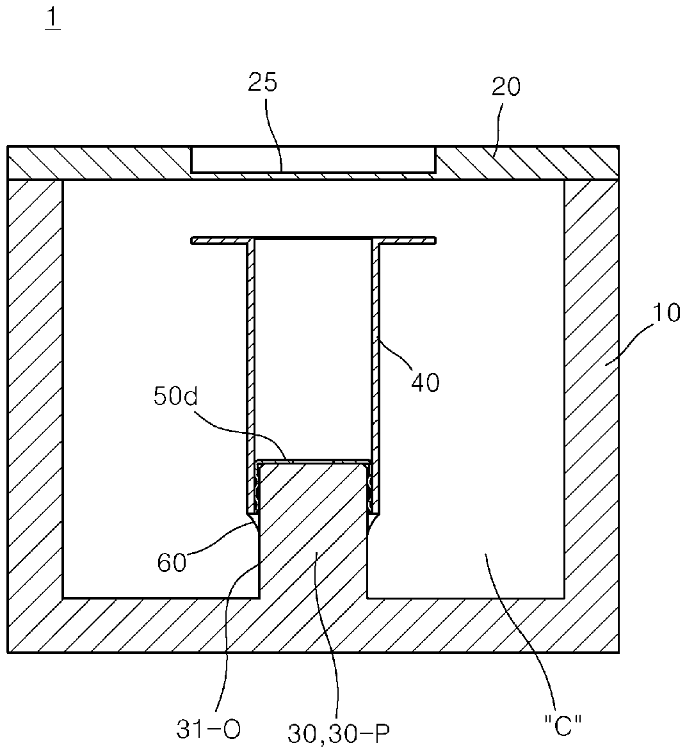
FIG. 13 is a cross-sectional view of FIG. 12.
Figure 14:
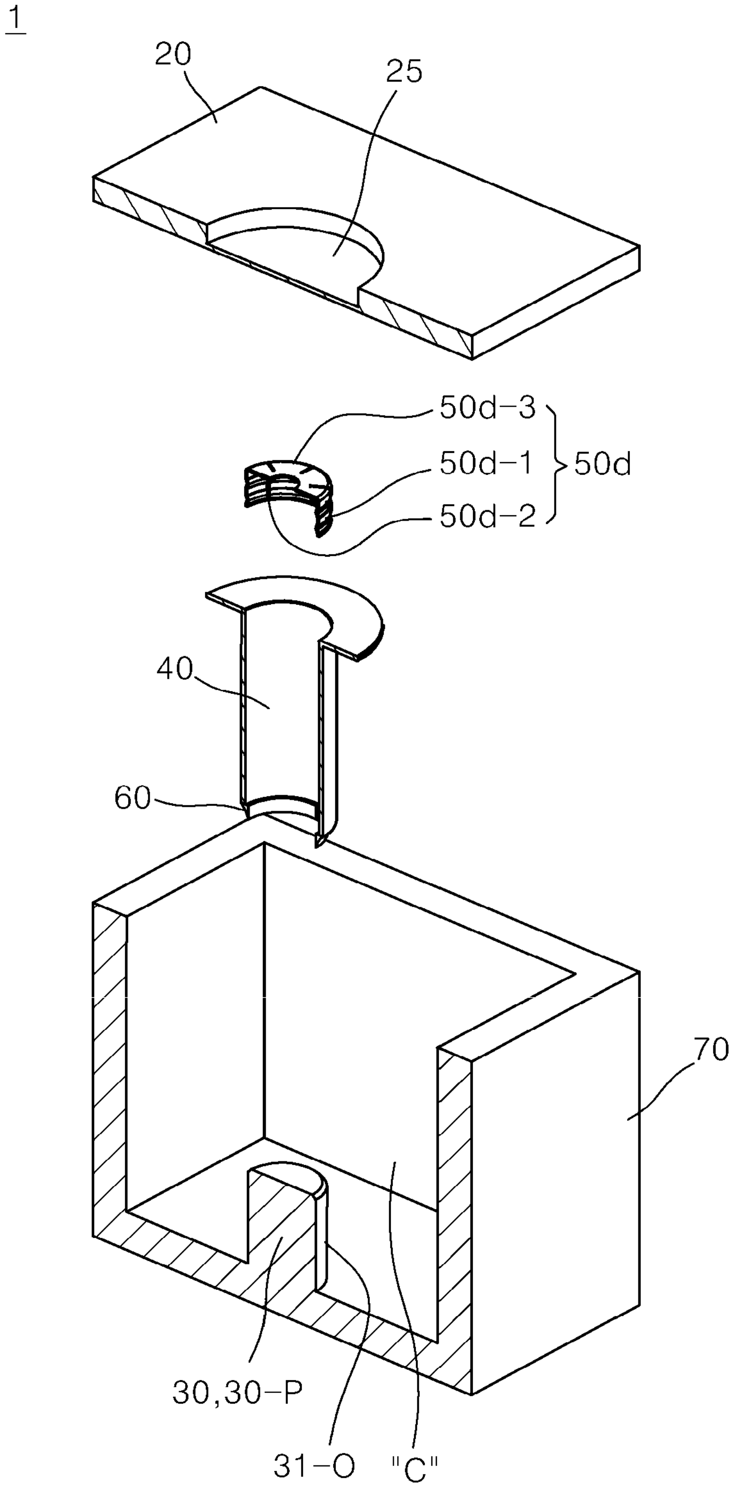
FIG. 14 is an incised and exploded perspective view of FIG. 6.
Figure 15:
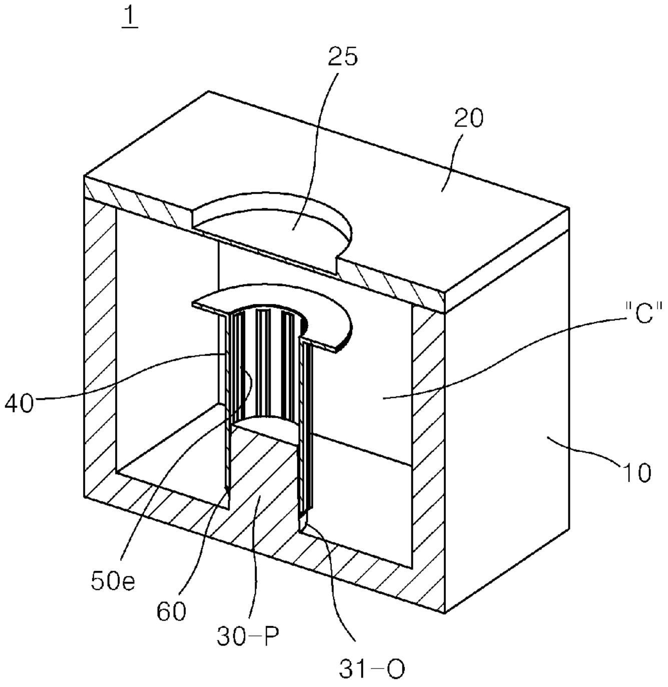
FIG. 15 is a cutaway perspective view taken along line A-A in FIG. 1, and is a cutaway perspective view illustrating a fifth embodiment of the tolerance management stopper part, among the components of the cavity filter for an antenna according to an embodiment of the present disclosure.
Figure 16:
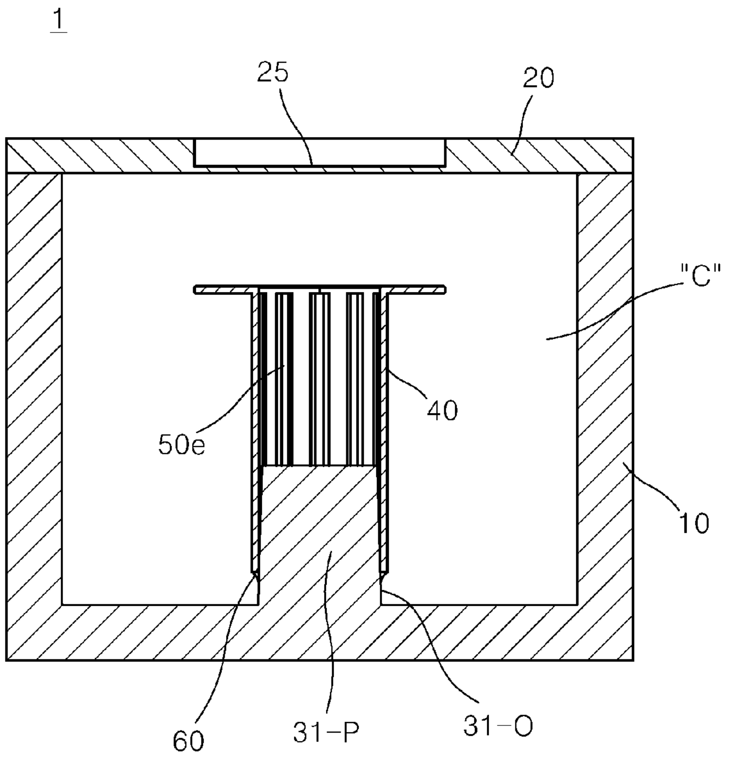
FIG. 16 is a cross-sectional view of FIG. 15.
Figure 17:
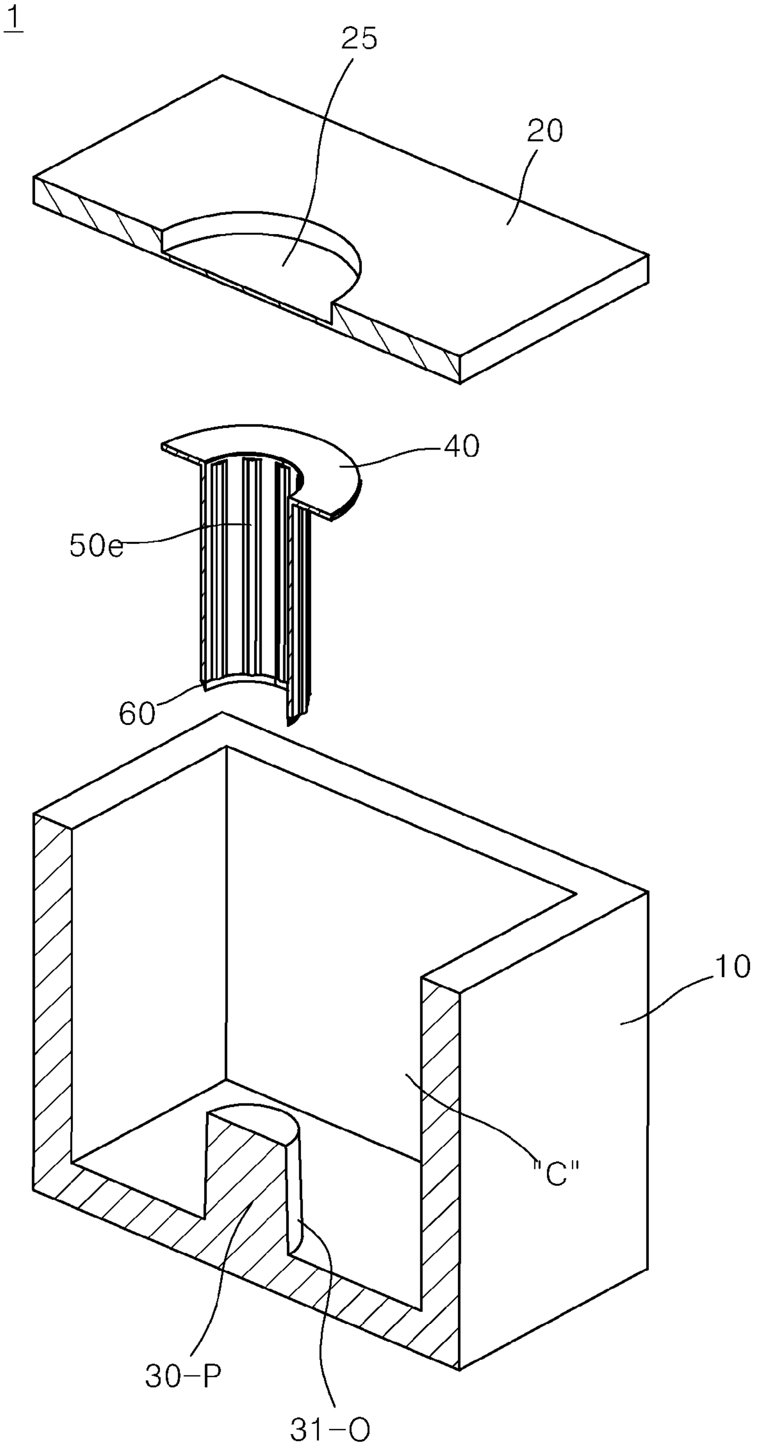
FIG. 17 is an incised and exploded perspective view of FIG. 15.

FIG. 12 is a cutaway perspective view taken along line A-A in FIG. 1, and is a cutaway perspective view illustrating the fourth embodiment of the tolerance management stopper part, among the components of the cavity filter for an antenna according to an embodiment of the present disclosure. FIG. 13 is a cross-sectional view of FIG. 12. FIG. 14 is an incised and exploded perspective view of FIG. 6. FIG. 15 is a cutaway perspective view taken along line A-A in FIG. 1, and is a cutaway perspective view illustrating the fifth embodiment of the tolerance management stopper part, among the components of the cavity filter for an antenna according to an embodiment of the present disclosure. FIG. 16 is a cross-sectional view of FIG. 15. FIG. 17 is an incised and exploded perspective view of FIG. 15.

Referring to FIGS. 2 to 11, in the cavity filter 1 for an antenna according to an embodiment of the present disclosure, the tolerance management stopper part 50*a*, 50*b*, 50*c* is implemented as an embodiment in which the tolerance management stopper part is provided as a separate component or integrally for the resonant design of the cavity C applied thereto, when the other end of the resonant bar 40 is fitted and coupled to the empty inside of the resonant bar boss 30-T that has been formed in the circular pipe shape at the bottom of the cavity C of the filter body 10.

However, the resonant bar boss 30 does not need to be essentially formed in the circular pipe shape. As in tolerance management stopper parts 50*d* and 50*e* according to the fourth embodiment and the fifth embodiment described later, the resonant bar boss may be implemented as a resonant bar boss 30-P (pole) that protrudes in one direction thereof from the bottom of the cavity C by a predetermined height and that has a cylindrical shape. The other end of the resonant bar 40 may be implemented in a form in which that the other end of the resonant bar is coupled to surround the outer circumferential surface of one end of the resonant bar boss 30-P.

In this case, the resonant bar boss 30-P that is provided in the cylindrical shape may be provided to have generally the same diameter as referenced in FIGS. 12 to 14, or may be formed in the cylindrical shape the diameter of which is gradually reduced in the one direction from the bottom of the cavity C as referenced in FIGS. 15 to 17.

Referring to FIGS. 12 to 14, like the tolerance management stopper part 50*c* that is implemented as the third embodiment, the tolerance management stopper part 50*d* that is implemented as the fourth embodiment may be provided in a form that is manufactured as a separate component and that is interposed between the inner circumferential surface of the resonant bar 40 and an outer circumferential surface 31-out (O) of the resonant bar boss 30-P. That is, the tolerance management stopper part 50*d* that is implemented as the fourth embodiment may be a friction member that is disposed between the outer circumferential surface 31-O of the resonant bar boss 30-P and the inner circumferential surface of the resonant bar 40.

More specifically, the tolerance management stopper part 50*d* that is implemented as the fourth embodiment has a wrinkled shape as referenced in FIGS. 12 to 14, but at least the diameter of an inner circumferential surface of the tolerance management stopper part that comes into contact with the outer circumferential surface 31-O of the resonant bar boss 30-P may be formed to have a size in which the inner circumferential surface of the tolerance management stopper part is forcedly fitted into the outer circumferential surface 31-O of the resonant bar boss 30-P.

In this case, if the tolerance management stopper part 50*d* that is implemented as the fourth embodiment is provided as a friction member, that is, a separate component, as referenced in FIG. 14, the tolerance management stopper part may include a wrinkle part 50*d*-1 that is interposed in the inner circumferential surface of the resonant bar 40, and that has the outside pressurizing the inner circumferential surface of the resonant bar 40 and the inside pressurizing the outer circumferential surface 31-O of the resonant bar boss 30-P.

Furthermore, the tolerance management stopper part 50*d* that is provided as a friction member and that is implemented as the fourth embodiment may further include a support plate part 50*d*-3 that is integrally formed on the other side of the wrinkle part 50*d*-1 and that is provided to surround one end of the resonant bar boss along with the wrinkle part 50*d*-1, and multiple incision parts 50*d*-2 that divide a part of the end of an edge of the support plate part 50*d*-3 and the wrinkle part 50*d*-1 in a way to be spaced apart from each other in a circumferential direction thereof.

In this case, the wrinkle part 50*d*-1 is also interposed between the inner circumferential surface of the resonant bar 40 and the outer circumferential surface 31-O of the resonant bar boss 30-P by the incision parts 50*d*-2, and may perform a role to facilitate forced fitting and coupling while being elastically deformed when an assembler (or a resonant tuning designer) provides an external force. In particular, if the resonant bar boss 30-P that is formed to have the same diameter (external diameter) from the bottom of the cavity C in one direction thereof in a cylindrical shape has the same diameter (internal diameter) as the resonant bar 40 that is coupled to the resonant bar boss 30-P, the wrinkle part 50*d*-1 of the tolerance management stopper part 50*d* that is provided as the friction member elastically generates frictional forces to the inside and outside thereof between the outer circumferential surface 31-O of the resonant bar boss 30-P and the inner circumferential surface of the resonant bar 40. Accordingly, the management of a tolerance can be easily performed by an external force that is provided by an assembler (or a resonant tuning designer).

Meanwhile, referring to FIGS. 15 to 17, the tolerance management stopper part 50*e* that is implemented as the fifth embodiment may be integrally formed on the inner circumferential surface of the resonant bar 40.

More specifically, unlike the tolerance management stopper part 50*d* that is implemented as the fourth embodiment, the tolerance management stopper part 50*e* that is implemented as the fifth embodiment provides an advantage in that a tolerance of the resonant bar 40 that is coupled to the resonant bar boss 30-P formed in the cylindrical shape the diameter of which is gradually reduced in the one direction thereof from the bottom of the cavity C can be managed more easily.

That is, as referenced in FIGS. 15 and 17, the tolerance management stopper part 50*e* that is implemented as the fifth embodiment is formed in a rib shape that protrudes in a central direction thereof from the inner circumferential surface of the resonant bar 40, and multiple protrusion ribs thereof provided to be spaced apart from each other in a cylindrical direction of the tolerance management stopper part may be integrally formed on the inner circumferential surface of the resonant bar 40. In this case, the multiple protrusion ribs are formed by convexly depressing a part of the outer circumferential surface of the resonant bar 40 toward the inside thereof. When the resonant bar 40 is fitted and coupled to surround the outer circumferential surface 31-O at one end of the resonant bar boss 30-P, the multiple protrusion ribs may be pressurized by being brought in line contact with the inclined outer circumferential surface 31-O of the resonant bar boss 30-P up and down, so that the management of a tolerance of the resonant bar 40 can be easily performed.

Acting effects of an embodiment of the cavity filter for an antenna according to the present disclosure, which has been constructed above, are briefly described as follows.

First, the embodiment 1 of the cavity filter for an antenna according to the present disclosure has an advantage in that a tolerance design range can be expanded because the resonant bar 40 is provided in a way to be movable with respect to the resonant bar boss 30 so that the resonant bar 40 is temporarily fixed to the resonant bar boss 30 through the tolerance management stopper part 50*a* to 50*e* upon primary resonant frequency tuning design within the cavity C.

Furthermore, since the tolerance design range is expanded through the provision of the tolerance management stopper part 50*a* to 50*e*, a post-processing process for the resonant bar 40, which is conventionally performed in order to satisfy a fine resonant frequency tuning design range, can be fully deleted.

Furthermore, weight of the resonant bar 40 is designed to have only to perform the fixing of the resonant bar to the resonant bar boss 30 by the solder part 60 after the primary resonant frequency tuning is completed. Accordingly, the entire production cost of a product can be reduced because the resonant bar 40 having a thin thickness compared to a conventional technology can be manufactured.

The embodiment of the cavity filter for an antenna according to the present disclosure has been described in detail with reference to the accompanying drawings. However, an embodiment of the present disclosure is not essentially limited to the aforementioned embodiment, and may include various modifications and implementations within an equivalent range thereof by a person having ordinary knowledge in the art to which the present disclosure pertains. Accordingly, the true range of a right of the present disclosure will be said to be defined by the appended claims.

INDUSTRIAL APPLICABILITY

The present disclosure provides the cavity filter for an antenna, which can extend a tolerance range upon manufacturing of a resonator and facilitates a frequency tuning design within a cavity.

The invention claimed is:

1. A cavity filter for an antenna, comprising:

a filter body having one side opened and having multiple cavities partitioned by barrier ribs;

a resonant bar installed in each of the multiple cavities;

a resonant bar boss having a part of the resonant bar inserted therein and provided so that the resonant bar is installed in a respective cavity;

a tolerance management stopper part disposed between an inner circumferential surface of the resonant bar boss and an outer circumferential surface of the resonant bar and configured to perform a moving and stop function in an insertion direction of the resonant bar upon resonant design of the cavity; and a solder part hardened after being applied to a front end of the resonant bar boss, when the resonant bar is temporarily fixed at a design location according to the resonant design by the tolerance management stopper part.

2. The cavity filter of claim 1, wherein the resonant bar boss protrudes in the one direction from a bottom of the cavity and is formed in a circular pipe shape having an empty inside.

3. The cavity filter of claim 1, wherein the solder part is applied and hardened so that the tolerance management stopper part is hidden from an outside.

4. The cavity filter of claim 1, wherein the tolerance management stopper part is integrally formed on the outer circumferential surface of the resonant bar that is inserted into the inner circumferential surface of the resonant bar boss.

5. The cavity filter of claim 1, wherein:

the tolerance management stopper part has a wrinkled shape, and at least a diameter of an outer circumferential surface of the tolerance management stopper part that comes into contact with the inner circumferential surface of the resonant bar boss is formed to have a size in which the outer circumferential surface of the tolerance management stopper part is forcedly fitted into the inner circumferential surface of the resonant bar boss.

6. The cavity filter of claim 1, wherein the tolerance management stopper part is a friction member disposed between the inner circumferential surface of the resonant bar boss and the outer circumferential surface of the resonant bar.

7. The cavity filter of claim 6, wherein the friction member comprises a wrinkle part that is interposed in the outer circumferential surface of the resonant bar and that has an outside pressurizing the inner circumferential surface of the resonant bar boss and an inside pressurizing the outer circumferential surface of the resonant bar.

8. The cavity filter of claim 7, wherein the friction member further comprises multiple incision parts formed by incising one side of the wrinkle part so that the multiple incision parts are spaced apart from each other in a circumferential direction thereof.

9. The cavity filter of claim 8, wherein the friction member further comprises a support plate part integrally formed on another side of the wrinkle part and provided to surround a front end of the resonant bar along with the wrinkle part.

10. The cavity filter of claim 1, wherein the resonant bar boss is formed in a cylindrical shape that protrudes in the one direction from a bottom of the cavity.

11. The cavity filter of claim 1, further comprising a filter cover configured to cover the opened one side of the cavity, wherein the resonant design for a cavity space is performed while repeatedly moving and stopping the resonant bar in a state in which the tolerance management stopper part has been installed, by using an external press-fitting member that has been inserted therethrough through a design hole for a cover for design that performs a cover function identical with a cover function of the filter cover and in which a predetermined design hole has been formed.

12. A cavity filter for an antenna, comprising:

a filter body having one side opened and having multiple cavities partitioned by barrier ribs;

a resonant bar installed in each of the multiple cavities;

a resonant bar boss having a part of the resonant bar inserted therein and provided so that the resonant bar is installed in a respective cavity; and a tolerance management stopper part disposed between an inner circumferential surface of the resonant bar boss and an outer circumferential surface of the resonant bar and configured to perform a moving and stop function in an insertion direction of the resonant bar upon resonant design of the cavity, wherein:

the tolerance management stopper part has a wrinkled shape, and at least a diameter of an inner circumferential surface of the tolerance management stopper part that comes into contact with an outer circumferential surface of the resonant bar boss is formed to have a size in which the inner circumferential surface of the tolerance management stopper part is forcedly fitted into the outer circumferential surface of the resonant bar boss.

13. The cavity filter of claim 12, wherein the tolerance management stopper part is a friction member disposed between the outer circumferential surface of the resonant bar boss and the inner circumferential surface of the resonant bar.

14. The cavity filter of claim 13, wherein the friction member comprises a wrinkle part that is interposed in the inner circumferential surface of the resonant bar and that has an outside pressurizing the inner circumferential surface of the resonant bar and an inside pressurizing the outer circumferential surface of the resonant bar boss.

15. The cavity filter of claim 14, wherein the friction member further comprises:

a support plate part integrally formed on another side of the wrinkle part and provided to surround one end of the resonant bar boss along with the wrinkle part; and multiple incision parts configured to divide a part of an end of an edge of the support plate part and the wrinkle part in a way to be spaced apart from each other in a circumferential direction thereof.

16. A cavity filter for an antenna, comprising:

a filter body having one side opened and having multiple cavities partitioned by barrier ribs;

a resonant bar installed in each of the multiple cavities;

a resonant bar boss having a part of the resonant bar inserted therein and provided so that the resonant bar is installed in a respective cavity; and a tolerance management stopper part disposed between an inner circumferential surface of the resonant bar boss and an outer circumferential surface of the resonant bar and configured to perform a moving and stop function in an insertion direction of the resonant bar upon resonant design of the cavity, wherein:

the resonant bar boss is formed in a cylindrical shape having a diameter gradually reduced in the one direction from a bottom of the cavity, and the tolerance management stopper part is formed in a rib shape that protrudes in a central direction thereof from the inner circumferential surface of the resonant bar, wherein multiple protrusion ribs provided to be spaced apart from each other in a cylindrical direction are integrally formed on the inner circumferential surface of the resonant bar.

* * * * *